(12) United States Patent
Kaufmann

(10) Patent No.: US 9,481,044 B2
(45) Date of Patent: Nov. 1, 2016

(54) METHOD FOR OBTAINING A COMPLETE THREADING PROFILE BY MILLING AND MILLING TOOL

(71) Applicant: DC Swiss SA, Malleray (CH)

(72) Inventor: Beat Kaufmann, Malleray (CH)

(73) Assignee: DC Swiss SA (CH)

( * ) Notice: Subject to any disclaimer, the term of this patent is extended or adjusted under 35 U.S.C. 154(b) by 33 days.

(21) Appl. No.: 14/267,621

(22) Filed: May 1, 2014

(65) Prior Publication Data
US 2014/0334888 A1 Nov. 13, 2014

(30) Foreign Application Priority Data
May 7, 2013 (EP) .................................. 13166887

(51) Int. Cl.
*B23G 5/18* (2006.01)
*B23C 3/32* (2006.01)
*B23G 1/32* (2006.01)

(52) U.S. Cl.
CPC . *B23G 5/18* (2013.01); *B23C 3/32* (2013.01); *B23G 1/32* (2013.01); *B23G 2210/48* (2013.01); *B23G 2240/36* (2013.01); *Y10T 407/1946* (2015.01); *Y10T 409/300112* (2015.01)

(58) Field of Classification Search
CPC ............. B23C 3/32; B23C 3/34; B23C 3/35; B23G 2210/48; B23G 5/18; B23G 2210/36; B23G 2210/26; B23G 2210/41; B23G 2200/16; B23G 5/06; B23G 1/32; B23G 2210/44; B23G 2200/00; B23G 2200/12; Y10T 407/1946; Y10T 407/195
USPC .......... 407/24–29, 20; 409/65; 408/215–217, 408/222
See application file for complete search history.

(56) References Cited

U.S. PATENT DOCUMENTS

| | | | | | |
|---|---|---|---|---|---|
| 1,202,195 | A | * | 10/1916 | Lees | B23G 5/18 407/24 |
| 1,328,430 | A | * | 1/1920 | Hathaway | B23B 51/08 144/240 |
| 1,441,015 | A | * | 1/1923 | Marye | B23G 5/06 407/24 |
| 1,567,733 | A | * | 12/1925 | Hanson | B23G 5/06 407/24 |
| 1,718,536 | A | * | 6/1929 | Dalzen | B23G 5/06 408/220 |
| 1,795,093 | A | * | 3/1931 | Olson | B23G 5/18 407/24 |
| 1,846,408 | A | * | 2/1932 | Thomson | B23G 5/06 408/217 |
| 1,846,501 | A | * | 2/1932 | Thomson | B23G 5/06 408/218 |

(Continued)

FOREIGN PATENT DOCUMENTS

| | | |
|---|---|---|
| DE | 19834039 A1 | 2/1999 |
| DE | 102005037309 A1 | 2/2007 |

(Continued)

*Primary Examiner* — Sara Addisu
(74) *Attorney, Agent, or Firm* — Blank Rome LLP

(57) ABSTRACT

A method for milling a threading of a screw or tapped hole. The threading has a cross section in the shape of a triangle with a truncated crest. The method includes milling a first flank (V1) of at least one spire of the thread by a first comb (A) of a milling tool (F). The teeth of the first comb (A) are spaced in relation to one another by a first pitch (P1). Then milling a second flank (V2) of at least one other spire of the thread by a second comb (B) of the milling tool (F), wherein the teeth of the second comb (B) are spaced in relation to one another by a second pitch (P2) equal to the first pitch (P1) and offset from the teeth of the first comb (A) by a phase displacement (DP). Then milling a truncated portion (V3) of the crest by a third comb (C) of the milling tool (F).

6 Claims, 6 Drawing Sheets

(56) References Cited

U.S. PATENT DOCUMENTS

| | | | | |
|---|---|---|---|---|
| 1,968,103 | A * | 7/1934 | Thomson | B23G 5/06 408/217 |
| 2,456,842 | A * | 12/1948 | Rutbell | B23F 21/166 407/20 |
| 3,220,032 | A * | 11/1965 | Van Vleet | B23G 5/06 408/218 |
| 3,355,752 | A * | 12/1967 | Haralampiev | B23G 5/06 408/220 |
| 3,574,911 | A * | 4/1971 | Penoyar | B23C 5/207 407/114 |
| 4,068,976 | A * | 1/1978 | Friedline | B23C 5/207 407/114 |
| 4,171,177 | A * | 10/1979 | Barnsdale | B23G 5/06 408/218 |
| 4,205,932 | A * | 6/1980 | Tennutti | B23F 21/166 407/25 |
| 4,655,648 | A * | 4/1987 | Hellbergh | B23C 5/16 144/218 |
| 4,907,920 | A * | 3/1990 | Lund | B23C 5/00 407/2 |
| 5,797,710 | A * | 8/1998 | Sawabe | B23G 7/02 408/215 |
| 6,042,308 | A | 3/2000 | Schmitt | |
| 6,499,917 | B1 * | 12/2002 | Parker | B23C 5/109 407/25 |
| 6,565,297 | B2 * | 5/2003 | Schmitt | B23G 5/182 409/131 |
| 7,682,111 | B2 * | 3/2010 | Omi | B23C 5/1081 407/53 |
| 8,096,734 | B2 * | 1/2012 | Sjoo | B23F 21/163 407/23 |
| 8,602,694 | B2 * | 12/2013 | Morgulis | B23C 5/109 407/24 |
| 8,708,612 | B2 * | 4/2014 | Men | B23C 5/109 407/42 |
| 2001/0018010 | A1 * | 8/2001 | Kichin | B23G 5/18 407/24 |
| 2006/0039770 | A1 * | 2/2006 | Hughes | B23G 1/20 409/234 |
| 2009/0162151 | A1 * | 6/2009 | Sjoo | B23C 3/30 407/35 |
| 2010/0260568 | A1 * | 10/2010 | Osawa | B23G 5/18 409/74 |
| 2015/0125229 | A1 * | 5/2015 | Glimpel | B23G 5/06 408/1 R |

FOREIGN PATENT DOCUMENTS

| | | | | |
|---|---|---|---|---|
| EP | 0733430 A1 * | 9/1996 | | B23G 5/182 |
| EP | 0950457 A2 | 10/1999 | | |
| FR | 483318 | 6/1917 | | |
| FR | 483318 A * | 6/1917 | | B23G 5/18 |
| JP | 11347839 A * | 12/1999 | | |
| JP | 2012086286 A * | 5/2012 | | |
| WO | WO-2009037094 A1 | 3/2009 | | |

* cited by examiner

METHOD FOR OBTAINING A COMPLETE THREADING PROFILE BY MILLING AND MILLING TOOL

The present application claims priority of European Patent Application EP131668873 filed on May 7, 2013, whose contents is hereby incorporated by reference.

FIELD OF THE INVENTION

The present invention relates to a milling tool and a milling method for milling an item provided with a threading and/or tapping, for example a screw or a precision tapped hole.

DESCRIPTION OF RELATED ART

Items provided with an external threading and/or an internal tapping, for example screws, tapped holes etc. can be manufactured using different methods and with different tools. It is for example well known in the state of the art to manufacture precision screws by milling by means of thread milling tools. An example of such a thread cutter is described in WO09037094. The requirements in terms of accuracy, however, require a machining precision that is very difficult to achieve with usual milling tools and milling methods.

DE102005037309 describes a milling tool whose teeth are spaced by at least twice the machined threading pitch. The threading method comprises a first rotation of the milling tool followed by a linear displacement along the milling tool's axis and a second rotation of the milling tool. This process is therefore relatively slow.

Thread milling tools having alternating teeth are also known in the state of the art. EP0950457 relates to a thread cutting tap whose profile comprises a first comb (i.e. a row of cutting teeth along an axis parallel to that of the milling axis) and a second comb that is offset relative to the first comb. This cutting tap makes it possible to tap threads into previously bored holes. The shape of the threads, in particular of the crest of the thread, is however poorly controlled.

It would also be possible to mill a threading by means of a milling tool having alternating teeth as illustrated in FIGS. 1A and 1B. FIG. 1A corresponds to the milling of an external threading in an item P, for example a screw, etc. FIG. 1B corresponds to an internal threading (called tapping) in a hole previously bored in an item P.

The milling tool F illustrated in these two figures comprises a first comb A with several teeth on the periphery of the milling tool. The pitch of the teeth of the first comb A is double the threading pitch 8 one wishes to mill into the item P. The periphery of the milling tool F comprises a second comb B with teeth spaced at the same double pitch, but offset by one pitch relative to the teeth of comb A. During the rotation of the milling tool around its longitudinal axis 3, the left flank of each spire is cut by the teeth of a first comb whilst the right flank is cut by the teeth of the other comb. The meeting point between the profiles of the two combs A and B is located about halfway up between the crest and the root of the milling tool's thread. Reference number 23 refers to the longitudinal axis of the internal or external threading to be achieved.

One advantage of thread milling by means of such a milling tool having alternating teeth is that the shape of the flanks of the cut thread does not depend on the root of the profile of the thread milling cutter, which is a portion that is difficult to execute with the required precision.

However, the thread produced on the item P with the milling tool F of FIG. 1 has a pointed top corresponding to the intersection between the two flanks.

Other shapes for the thread crest can be conceived of, by modifying the teeth of the combs A and B, but the accuracy of this delicate zone at the top depends on the exact shape of the two teeth A and B and of the intersection point between the trajectory of these two teeth. The result is a milled threading whose crest shape is pointed and not properly controlled.

Alternatively, in the case of an external threading on a previously turned item or of an internal threading in a previously bored hole, the top of the threading spires can also correspond to the machining diameter respectively to the prior boring diameter. The threading flanks are then determined by the milling tool's run, with the exception of the tops of the threading spires that correspond to the machining or prior boring diameter and are thus determined by the run of the bit or chisel used for this preliminary operation. It is thus difficult with this method to achieve high-quality threads; the top is frequently deformed due to an imperfect alignment between the thread milling tool and the chisel respectively the drill bit. A simple drilling or machining does not allow the shape of the thread crest to be controlled and an ideal crest shape to be achieved, for example non-planar. The crest's shape is thus dissociated from the shape and position of the flanks of each spire.

In many applications, the thread crest of screws or of tapped holes is considered not very critical and the accuracy that can be achieved with milling tools having alternating teeth is thus deemed acceptable. For some precision applications the requirements in terms of precision are however very high and it has been observed that the precision achieved using known milling tools with alternating teeth is insufficient.

BRIEF SUMMARY OF THE INVENTION

One aim of the present invention is thus to propose an improved milling method for screws or tapped holes, notably a method enabling the shape of the machined profile to be better controlled.

Another aim is to machine an external threading or internal tapping whose shape depends only on the milling operations.

Another aim is to propose a milling tool for high precision milling, notably a milling tool that enables the shape of the machined profile, notably the shape of the thread crest, to be better controlled.

In particular, one aim is to determine by milling the complete threading profile.

According to the invention, these aims are achieved notably by means of a method for milling an item provided with a threading and/or tapping, for example a screw threading or a tapped hole, wherein said threading has a cross section in the shape of a triangle with a truncated crest, comprising the following steps:

milling a first flank of at least one spire of said thread by means of a first milling tool comb, wherein the teeth of said first comb are spaced in relation to one another by a first pitch, milling a second flank of said spire of said thread by means of a second milling tool comb, wherein the teeth of the second comb are spaced in relation to one another by a second pitch equal to the first pitch, wherein the teeth of the second comb are offset from the teeth of the first comb by a phase displacement (DP), milling said truncated crest of the threading by means of a third comb of said milling tool.

This method has all the advantages of milling with a milling tool having alternating teeth, and notably an excellent accuracy of the machined thread flanks and that does not depend on the precision of the profile root of the thread milling cutter. The additional use of the third comb further makes is possible to avoid the disadvantages of milling tools having alternating teeth, by allowing the crest of the thread to be truncated.

In one embodiment, the milling is achieved by means of a milling tool having a fourth comb whose teeth have the same phase as those of the first comb and are spaced in relation to one another by the first pitch. The action of the fourth comb is thus the same as that of the first comb.

In one embodiment, the milling is achieved by means of a milling tool having a fifth comb whose teeth have the same phase as those of the second comb and are spaced in relation to one another by the second pitch. The action of the fifth comb is thus the same as that of the second comb.

The milling tool has 3 or 5 combs (depending on the embodiment) producing a threading having a cross section in the shape of a triangle with truncated crest.

During milling, the milling tool simultaneously performs one rotation around its longitudinal axis.

During milling, the milling tool simultaneously performs one translation along its longitudinal axis. Alternatively, the item moves relative to the milling tool in parallel to the milling tool's longitudinal axis.

During milling, the milling tool can furthermore perform simultaneously a rotation around the longitudinal axis of the threading to be machined, in order to turn around the item to be threaded or inside the hole to be tapped, in order to mill its entire periphery.

In a variant embodiment, the threading is achieved by making the item to be threaded turn around the milling tool's longitudinal axis.

In another embodiment, the item to be threaded turns around the longitudinal axis of the threading to be achieved.

Depending on the number of teeth, the milling can be performed on the entire length of an item (rod or hole) in a single run of the milling tool.

In a milling tool having five combs, the milling tool's combs work in pairs alternately; the combs of each pair make it possible to cut the item by controlling the depth with a first run of the first comb of the pair and then a second run of the other comb of that pair.

The last comb serves to hone the top of the profile of the screw or tapped hole.

The invention also relates to a milling tool for milling an item provided with a threading and/or tapping, for example a screw threading or a tapped hole, wherein said threading has a cross section in the shape of a triangle with a truncated crest, the milling tool comprising:

a first comb having a first series of teeth for milling a first flank of at least one spire of said thread, wherein the teeth of said first comb are spaced in relation to one another by a first pitch, a second comb having a second series of teeth for milling a second flank of said at least one spire of said thread, wherein the teeth of the second comb are spaced in relation to one another by a second pitch equal to the first pitch and offset by a phase displacement (PD) from said teeth of the first comb, a third comb for milling said truncated crest.

A fourth comb can be provided for milling the first flank of said threading, wherein the teeth of the fourth comb are spaced in relation to one another by the first pitch and have the same phase as those of the first comb.

A fifth comb can be provided for milling the second flank of said threading, wherein the teeth of the fifth comb are spaced in relation to one another by the second pitch equal to the first pitch and have the same phase as said teeth of the second comb.

The milling tool can comprise a shaft and a cutting portion at the extremity of said shaft. The teeth can be placed at the periphery of said cutting portion. Each of said series of teeth can comprise several teeth parallel to one another and essentially perpendicular to the longitudinal axis of said shaft.

BRIEF DESCRIPTION OF THE DRAWINGS

The invention will be better understood with the embodiment details that are given in the following description and illustrated by the FIGS. 1 to 5, given by way of non limiting examples, in which.

EXAMPLE(S) OF EMBODIMENTS OF THE INVENTION

Figure 2:
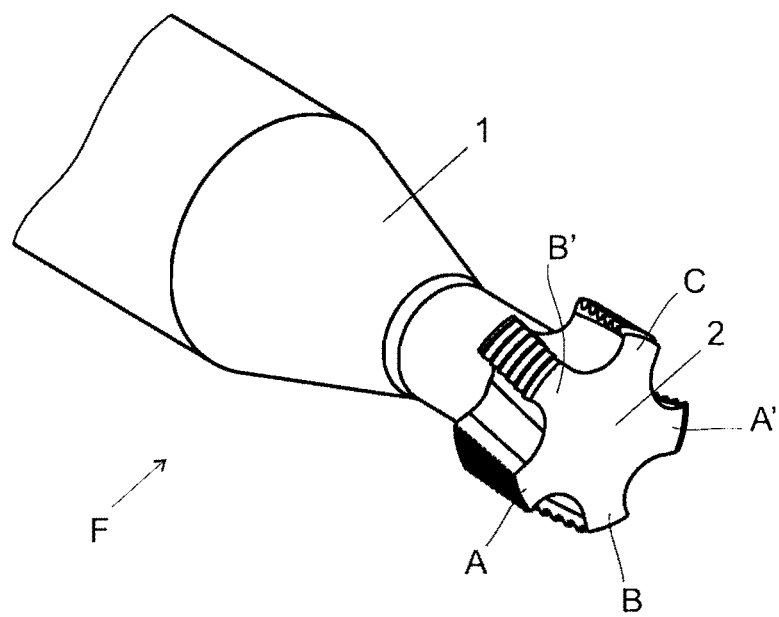
FIG. 2 illustrates a view in perspective of a milling tool according to the invention.
Figure 3:
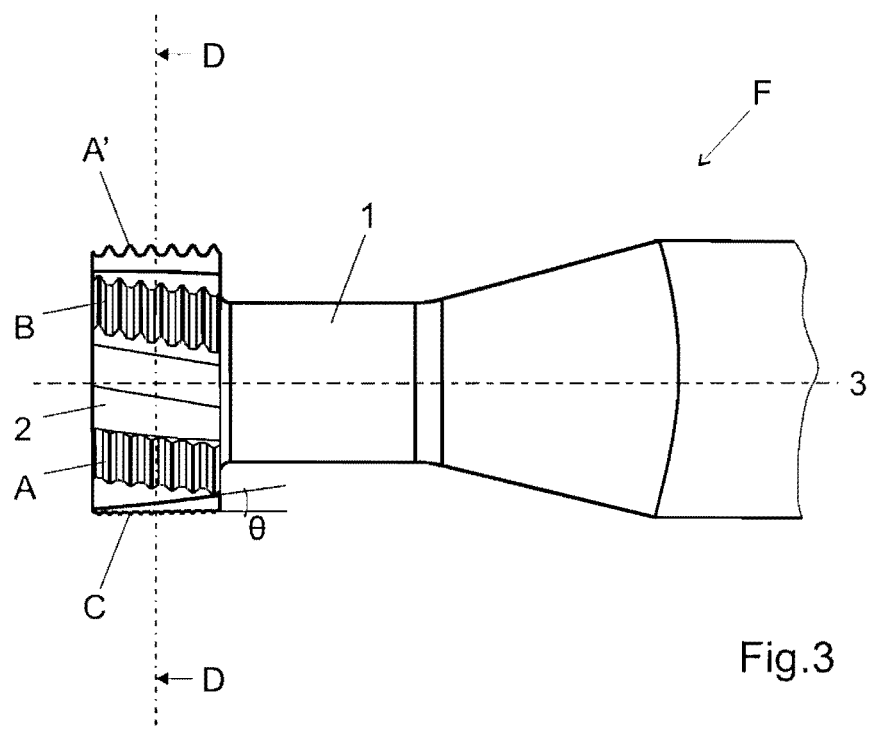
FIG. 3 illustrates a side view of a milling tool head according to the invention.

FIGS. 2 and 3 illustrate a thread milling cutter F for milling items provided with an external threading, for example threaded screws or rods, or items provided with an internal threading for example tapped holes.

Figure 1A:
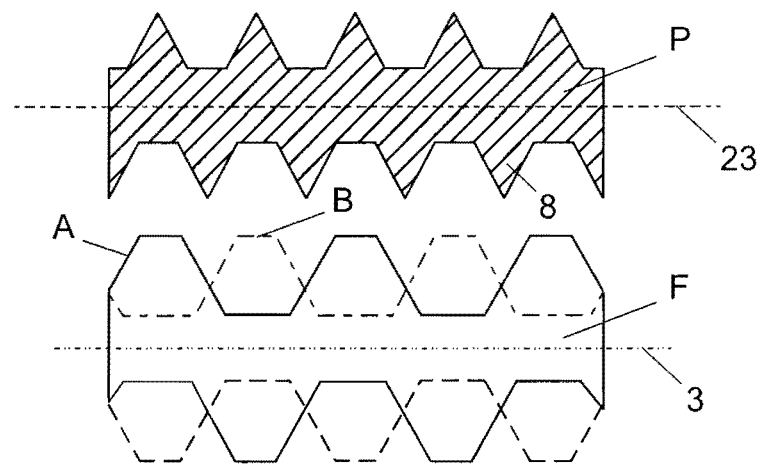
FIG. 1A illustrates a longitudinal cross section view of a milling tool having alternating teeth as well as of a portion of the item provided with an external threading machined with this milling tool.
Figure 1B:
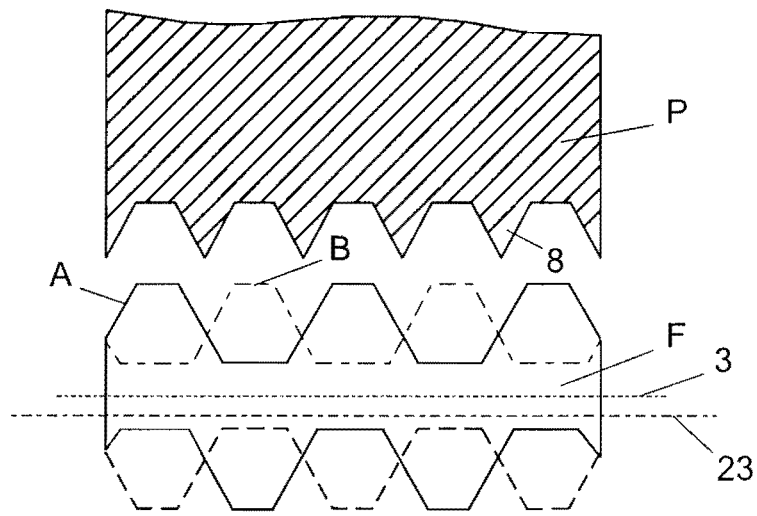
FIG. 1B illustrates a longitudinal cross section view of a milling tool having alternating teeth as well as of a portion of the item provided with an internal threading (tapping) machined with this milling tool.
Figure 1B:
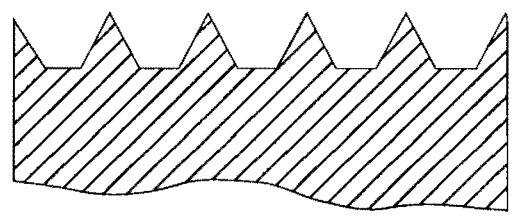

As the milling tool described further above in relation to FIGS. 1 and 2, this milling tool enables a threading to be machined on an item whose section has a triangular shape with a truncated crest. The truncated crest of the threading is located at the convex extremity of the threading in the case of an item with an external threading (FIG. 1A) as in the case of an internal threading (figure B).

In the case of an external threading, the item to be threaded P can be turned beforehand with a radius slightly greater than the maximum radius of the spires at their top. In the case of an internal threading, the item to be threaded P can be bored beforehand with a radius slightly smaller than the minimum radius at the top of the spires. The turning or boring radius has however no influence on the shape or dimension of the spires obtained, which are determined only by the threading described further below.

The milling tool comprises a rod 1 for mounting it into the chuck of a machine, a cutting portion 2 and a longitudinal axis 3.

Figure 4:
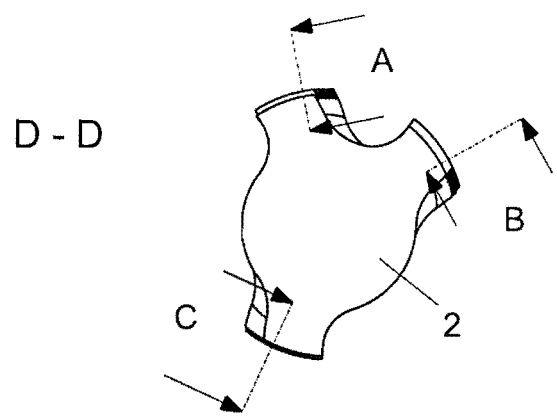
FIG. 4 illustrates a cross section view along D-D of the head of a milling tool having three combs according to the invention.
Figure 5:
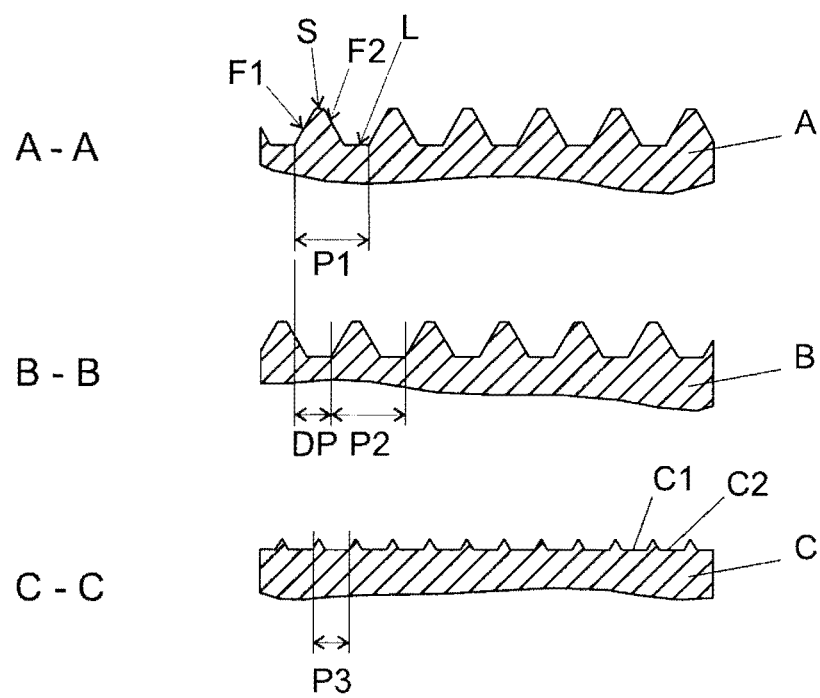
FIG. 5 illustrates a view along the sections A-A, B-B and C-C, respectively, of the three combs of the milling tool of FIGS. 2 to 3, showing notably the phase displacement between the different combs.

The periphery of the cutting portion 2 comprises several combs (or rows of teeth on the periphery), for example 5 combs A, B, C, A', B' on the embodiment of FIGS. 2, 3, 7 and 8, or 3 combs A, B, C on the embodiment of FIGS. 4 and 5. Each comb comprises one row with several radial teeth parallel to one another. The different teeth of each comb can extend at the periphery along a direction parallel to the longitudinal axis 3 of the milling tool, or preferably along a spiral portion on this periphery.

Figure 7:
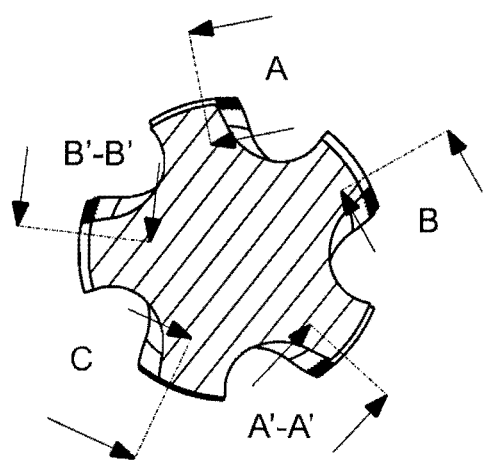
FIG. 7 illustrates a cross section view of the head of a milling tool having five combs according to the invention.

FIG. 4 is a cross section view of a cutting head 2 with three combs A, B, C; FIG. 7 is a cross section view of a cutting head 2 with five combs A, B, C, A', B'. A different number of combs, for example 6 combs A, B, C, A', B', C'; 7 combs A, B, C, A', B', A'', B'' etc. can be used in the frame of the invention.

Figure 8:
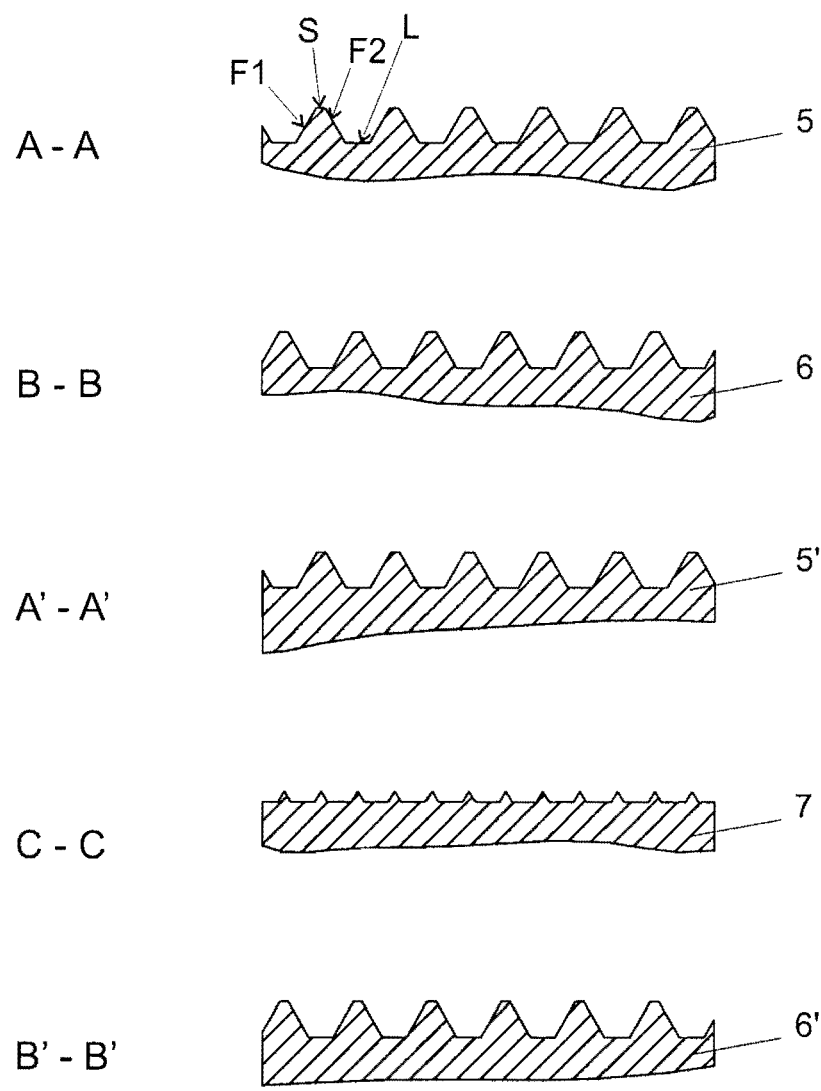
FIG. 8 illustrates a view along the sections A-A, A'-A', B-B, B'-B', C-C and D-D, respectively, of the three combs of the milling tool of FIG. 7, showing notably the phase displacement between the different combs.

As can be seen in FIGS. 5 and 8, the teeth of the first comb A are spaced in relation to one another by a first pitch P1. This pitch is equal to the double of the pitch of the threading PF (FIG. 6) that is to be machined. The teeth of the second comb B are spaced in relation to one another by a second pitch P2 equal to the first pitch P1; relative to the teeth of comb A, the teeth of comb B are offset by a phase displacement DP equal to the threading pitch PF. Thus, the combs A and B constitute alternating teeth for machining alternately the sides of the spires of the item to be machined.

The teeth of the third comb C are spaced in relation to one another by a pitch P3 equal to the threading pitch, i.e. half of the first pitch P1 and of the second pitch P2. A third comb deprived of teeth can also be used.

In the case of a milling tool with five combs as that illustrated in FIGS. 2, 3, 7 and 8, three of the combs are equivalent to those of the three-combed milling tool described here above. An additional comb A' is equivalent to the comb A, i.e. its teeth are spaced by the same pitch P1=2 PF and in that this comb cuts the same flanks of the same spires as the comb A. In a preferred embodiment, the teeth of the comb A' have a phase aligned on those of the comb A. In the same fashion, the additional comb B' is equivalent to the comb B, i.e. its teeth are spaced by the same pitch P2=2 PF and in that this comb cuts the same flanks of the same spires as comb B. In a preferred embodiment, the teeth of comb B' have a phase aligned on those of comb B. Using a five-combed milling tool produces the same result as that of a three-combed milling tool, but reduces the cutting effort on each tooth and makes the evacuation of the chips easier.

The milling of the threading on the item to be machined P is done in pairs of flanks, in an alternating fashion, i.e. the teeth of comb A (and A') mill the even thread roots (L) whilst the teeth of comb B (and B') mill the odd thread roots, or vice-versa. The milling of the item P can thus be performed in a single turn of the milling tool F around itself. It can be performed in a single operation on the entire length of a rod or opening; alternatively, an axial displacement of the milling tool can be performed to mill in several operations a single thread composed of several successive segments of the same item.

During milling, the milling tool performs simultaneously a rotation around its longitudinal axis 3 and a translation along its longitudinal axis 3. In another embodiment, the milling tool performs a rotation around its longitudinal axis 3 whilst the item to be threaded moves linearly in parallel to the rotation axis of the milling tool.

The threading is obtained by a movement of interpolation that is superimposed to these two rotation movements of the milling tool on its longitudinal axis and to this relative longitudinal displacement of the milling tool in relation to the item. Three variant methods are possible in the frame of the invention:

In a first embodiment, the milling tool F turns around the longitudinal axis 23 of the inner or outer threading to be obtained. This embodiment makes it possible to achieve threading with a machine in which the tools can move around the unmoving item.

In a second embodiment, the interpolation is achieved by making the item P to be threaded turn around the axis 3 of the milling tool F. This embodiment makes it possible to perform threading with a machine in which the item can move around the tools, whose axial position remains fixed.

In a third embodiment, the interpolation is achieved by making the item P to be threaded turn around the axis 23 of the threading to be obtained. This embodiment however has the disadvantage of requiring more considerable displacements of the item to be threaded.

Figure 6:
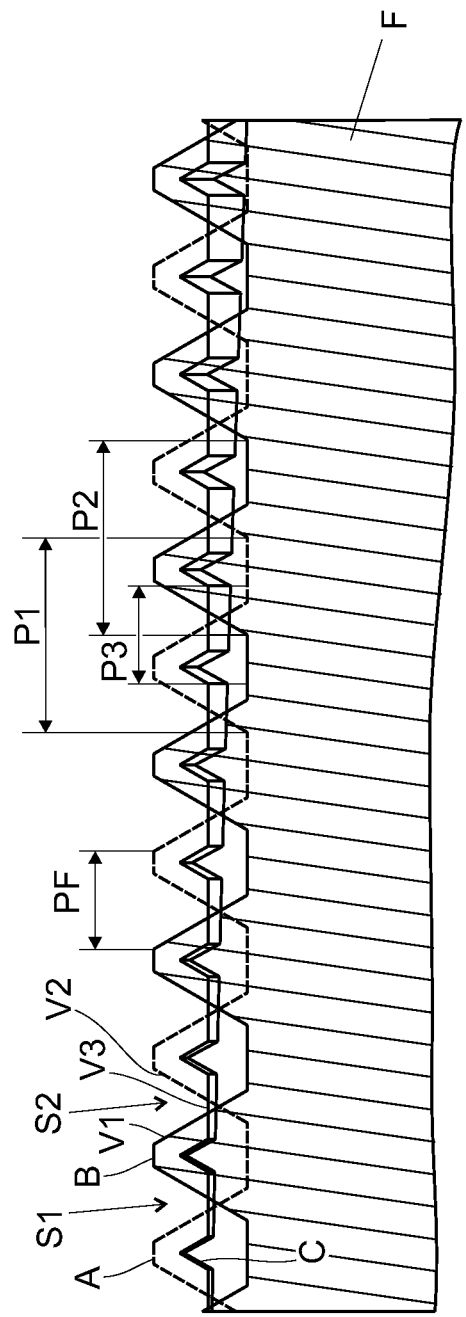
FIG. 6 illustrates the superposition of the profiles of the combs of the milling tool of FIGS. 2 to 5, from which results the profile of the obtained threading.

FIG. 6 illustrates the resulting threading that is produced by superimposing the profiles of the three combs A, B and C of the milling tool F. In this example, each comb comprises six teeth and the milling tool produces in a single turn on its axis 3 a thread with 11 spires $S_1$. As can be seen on this figure, a flank V1 of the second spire $S_2$ and of all even spires, is machined by a tooth from the comb B and B', whilst the opposite flank V2 of the same spire $S_2$ is machined by a tooth of the comb A and A'. Inversely, the left and right flanks of the odd spires are machined by the comb B and B' resp. A and A'.

The third comb C makes it possible to mill the truncated top of each spire of the thread, in order to produce a threading with a spire top having an accurate and perfectly controlled shape. As can be seen in FIG. 6, the top of the spires of the machined thread is machined by the cutting edges C1 of the comb C between the teeth C2 of this comb. The different cutting edges C1 make it possible to machine successive spire tops. These cutting edges C1 can be linear (planar), as illustrated in FIG. 5, in order to machine a flat spire top in an accurately controlled position. It is also possible to provide a milling tool with non linear cutting edges C1, for example concave, in order to machine spire tops that are not planar, for example concave. Furthermore, it is also possible to provide successive cutting edge segments C1 parallel to one another, as in FIG. 5, or non-parallel to one another.

The teeth C2 are optional and do not normally contribute to the machining; they however make it easier to machine a comb in which the cutting edges C1 are not co-planar. Indeed, as is seen in FIGS. 3 and 6, this cutting edge C1 is advantageously inclined by an angle θ relative to the longitudinal axis 3 of the milling tool, so as to produce helical spires with thread heights that vary progressively along the object.

REFERENCE NUMBERS USED IN THE FIGURES

F milling tool
1 rod
2 cutting portion 3 longitudinal axis of the milling tool
A first comb
B second comb
C third comb
C1 cutting edge of the comb C
C2 teeth of the comb C
A' fourth comb, having a phase aligned with comb A
B' fifth comb, having a phase aligned with comb B
P item to be machined
PF pitch of the machined profile
P1 pitch of comb A
P2 pitch of comb B
P3 pitch of comb C
DP offset between the teeth of comb A and of comb B
V1 first flank
V2 second flank
V3 truncated portion of the top
S crest of a tooth of comb A
L root of a tooth of comb B
S1 spires

The invention claimed is:

1. Milling tool for milling a threading and/or tapping, wherein said threading and/or tapping has a cross section in the shape of a triangle with a truncated crest, the milling tool comprising:
    a first comb having a first series of teeth for milling a first flank of at least one spire of said threading and/or tapping, wherein the teeth of said first comb are spaced in relation to one another by a first pitch,
    a second comb having a second series of teeth for milling a second flank of said at least one spire of said threading and/or tapping, wherein the teeth of the second comb are spaced in relation to one another by a second pitch equal to the first pitch and offset by a phase displacement from said teeth of the first comb, and
    a third comb comprising at least one cutting edge for only truncating a crest of a top of the at least one spire of said threading and/or tapping.

2. Milling tool according to claim 1, wherein said teeth of the first and of the second comb are spaced by a pitch equal to half of the pitch of the machined threading.

3. Milling tool according to claim 1, comprising:
    a fourth comb for milling the first flank of said threading, wherein the teeth of the fourth comb are spaced in relation to one another by the first pitch and have a phase aligned on said teeth of the first comb,
    a fifth comb for milling the second flank of said threading, wherein the teeth of the fifth comb are spaced in relation to one another by the second pitch equal to the first pitch and have a phase aligned on said teeth of the second comb.

4. Milling tool according to claim 1, wherein said cutting edge of the third comb is inclined relative to a longitudinal axis of the milling tool.

5. Milling tool according to claim 1, wherein the milling tool comprises a shaft, a longitudinal axis and a cutting portion at the extremity of said shaft, the teeth being placed at the periphery of said cutting portion.

6. Milling tool according to claim 5, wherein each of said series of teeth comprises several teeth parallel to one another and essentially perpendicular to the longitudinal axis of said shaft.

* * * * *